United States Patent
Joo et al.

(10) Patent No.: US 9,318,948 B2
(45) Date of Patent: Apr. 19, 2016

(54) POWER CIRCUIT PART, POWER CONTROL METHOD THEREOF AND DISPLAY APPARATUS HAVING THE SAME

(71) Applicant: Samsung Electronics Co., Ltd., Suwon-si (KR)

(72) Inventors: Sung-yong Joo, Yongin-si (KR); Jin-hyung Lee, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/222,178

(22) Filed: Mar. 21, 2014

(65) Prior Publication Data

US 2014/0368741 A1 Dec. 18, 2014

(30) Foreign Application Priority Data

Jun. 12, 2013 (KR) .................. 10-2013-0067014

(51) Int. Cl.
*H04N 5/63* (2006.01)
*H02M 1/42* (2007.01)
*H02M 1/32* (2007.01)

(52) U.S. Cl.
CPC .............. *H02M 1/4208* (2013.01); *H02M 1/32* (2013.01); *H02M 1/4225* (2013.01); *H04N 5/63* (2013.01); *Y02B 70/126* (2013.01)

(58) Field of Classification Search
CPC ......... H04N 5/63; H02M 1/42; H02M 1/4208
USPC ........... 348/730, 552, 553; 363/89, 69, 21.04, 363/21.12, 81, 84, 125, 127, 146
See application file for complete search history.

(56) References Cited

U.S. PATENT DOCUMENTS

| 6,686,725 | B1 | 2/2004 | Choi et al. | |
|---|---|---|---|---|
| 7,495,875 | B2 * | 2/2009 | Lin | 361/89 |
| 7,838,142 | B2 * | 11/2010 | Scheucher | 429/99 |
| 8,164,932 | B2 * | 4/2012 | Sims et al. | 363/69 |
| 8,654,263 | B2 * | 2/2014 | Chang | 348/730 |
| 2007/0139984 | A1 * | 6/2007 | Lo | 363/89 |

(Continued)

FOREIGN PATENT DOCUMENTS

| WO | 0221671 A1 | 3/2002 |
|---|---|---|
| WO | 03005110 A1 | 1/2003 |

OTHER PUBLICATIONS

Communication, Issued by the European Patent Office, Dated Feb. 2, 2015, in counterpart European Application No. 14154798.4.

(Continued)

*Primary Examiner* — Trang U Tran
(74) *Attorney, Agent, or Firm* — Sughrue Mion, PLLC (57) ABSTRACT

A power circuit part, a power control method and a display apparatus having the same control an output DC voltage supplied as operating power to elements such as a display to be variably output at different levels according to a voltage level of input AC power. The power circuit part includes a rectifier configured to rectify a current of an input alternating current (AC) power into a direct current (DC); and a power factor corrector configured to output a DC voltage output set at a DC voltage level corresponding to an AC voltage level of the input AC power, and supplies the DC voltage as operating power to the electronic apparatus, wherein the DC voltage level is selected from a plurality of target DC voltage levels each corresponding to at least one of a plurality of AC voltage level ranges.

28 Claims, 5 Drawing Sheets

(56) References Cited

U.S. PATENT DOCUMENTS

| | | |
|---|---|---|
| 2010/0002469 A1 | 1/2010 | Young et al. |
| 2010/0002474 A1 | 1/2010 | Moon et al. |
| 2010/0045210 A1 | 2/2010 | Hiraharan et al. |
| 2010/0080026 A1 | 4/2010 | Zhang et al. |
| 2010/0270982 A1* | 10/2010 | Hausman, Jr. ........ H02M 5/293 320/166 |
| 2011/0273098 A1* | 11/2011 | Grajcar ........................ 315/186 |
| 2012/0001566 A1 | 1/2012 | Josefowicz et al. |
| 2012/0014150 A1 | 1/2012 | Domb |
| 2012/0092913 A1 | 4/2012 | Harrison |
| 2012/0201061 A1 | 8/2012 | Hampo et al. |
| 2013/0049709 A1 | 2/2013 | Fu et al. |
| 2013/0051096 A1 | 2/2013 | Carletti et al. |

OTHER PUBLICATIONS

Communication issued Dec. 3, 2015 by the European Patent Office in counterpart European Application No. 14154798.4.

* cited by examiner

POWER CIRCUIT PART, POWER CONTROL METHOD THEREOF AND DISPLAY APPARATUS HAVING THE SAME

CROSS-REFERENCE TO RELATED APPLICATION

This application claims priority from Korean Patent Application No. 10-2013-0067014, filed on Jun. 12, 2013 in the Korean Intellectual Property Office, the disclosure of which is incorporated herein by reference in its entirety.

BACKGROUND

1. Field

Apparatuses and methods consistent with exemplary embodiments relate to a power circuit part, a power control method thereof and a display apparatus having the same, and more particularly, to a power circuit part, a power control method thereof and a display apparatus having the same which controls an output direct current (DC) voltage supplied as operating power to elements such as a display to be gradually output, at different levels depending on a voltage level of input alternating current (AC) power.

2. Description of the Related Art

A condenser-input power circuit apparatus which uses a switching mode power supply (SMPS), which may be implemented in a display apparatus including a television (TV), may include a power factor corrector to correct an unavoidable power factor and harmonic distortion when a current waveform becomes a pulse rather than a sine wave. Such power factor corrector typically uses a voltage control loop to convert a DC voltage input through a rectifier into an output DC voltage at a predetermined level to thereby correct the power factor and supply operating power at a necessary level to elements such as a display.

Figure 1:
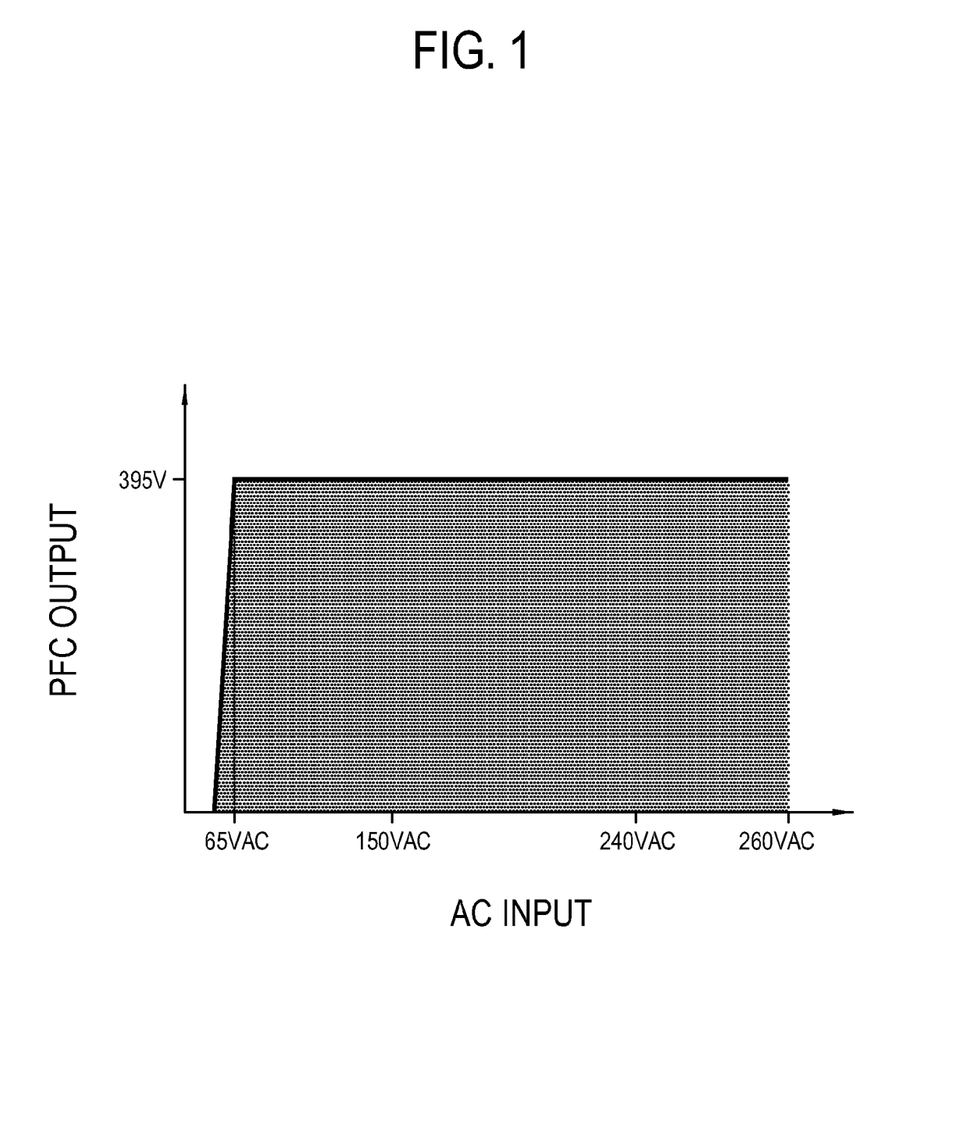
FIG. 1 is a graph illustrating a DC voltage output as operating power by a power factor corrector of a conventional power circuit apparatus according to a level of an input AC voltage.

As shown in FIG. 1, a related art power circuit apparatus may receive AC power at various levels starting around approximately 65V or more as commercial input power may depend on countries, territories, or power supply conditions. The power circuit apparatus may then convert such input power into a high DC voltage of approximately 395V at a single level regardless of the size of the input power, and supplies the converted DC voltage as operating power. As a result, AC-DC conversion efficiency of the power circuit apparatus is reduced when the input AC voltage is a low voltage close to approximately 65V. This is because the power circuit apparatus converts the input AC voltage into the single high DC voltage of approximately 395V regardless of whether the AC voltage is a low voltage such as approximately 110 to 120V that is closer to approximately 65V, or a high voltage such as approximately 220 to 240V that is closer to approximately 395V. Accordingly, the parts such as an inductor, field effect transistor (FET) and diode used in a power factor corrector of a power circuit apparatus will need high specifications to operate with a high current and at a high voltage of approximately 395V. Thus, not only does the DC bias increase but the power supply apparatus may become larger and manufacturing costs may increase.

The related art power factor corrector may be controlled to operate even in the case where a high AC voltage of approximately 260V is input as AC power. This may then lead to the voltage stress, which is imposed upon the parts such as a snubber, the FET, and diode of the power factor corrector, to increase. To mitigate the voltage stress, parts with high specifications are implemented thereby increasing the manufacturing costs.

Thus, the power factor corrector only outputs a high DC voltage at a single level of approximately 395V as an output voltage, and this restricts input power setup of a power switching unit such as a DC-DC local link converter (LLC) which controls a voltage and supplies currents at a consistent level to elements.

SUMMARY

One or more exemplary embodiments provide a power circuit part, a power control method thereof and a display apparatus having the same which controls an output DC voltage supplied as operating power to elements such as a display to be gradually output at different levels according to a voltage level of input AC power to thereby prevent deterioration of AC-DC conversion efficiency which occurs due to a high DC voltage output at a single level regardless of a level of the input AC voltage and prevent upsizing of the display apparatus and/or increase in manufacturing costs which occur due to a usage of parts with high specifications.

According to an aspect of an exemplary embodiment, there is provided a power circuit part of an electronic apparatus, the power circuit part including a rectifier configured to rectify a current of an alternating current (AC) power input that is provided as input power into a direct current (DC), and a power factor corrector configured to output a DC voltage output set at a DC voltage level corresponding to an AC voltage level of the AC power input, and supplies the DC voltage as operating power to the electronic apparatus, wherein the DC voltage level is selected from a plurality of target DC voltage levels each corresponding to at least one from a plurality of AC voltage level ranges.

The power factor corrector may include an AC voltage detector configured to detect the AC voltage level, and a power factor correction (PFC) controller configured to control the DC voltage level of the DC voltage output by setting the rectifier to rectify the AC power input to the DC voltage level selected from the plurality of target DC voltage levels corresponding to the plurality of AC voltage level ranges according to the AC voltage level of the AC voltage input detected by the AC voltage detector.

The plurality of AC voltage level ranges may include a first AC voltage level range, a second AC voltage level range, and a third AC voltage level range.

The first AC voltage level range, the second AC voltage level range, and the third AC voltage level range may include voltage ranges of 65 to 150V, of 150 to 240V and of 240 to 260V, respectively.

The plurality of AC voltage level ranges may further include a first abnormal AC voltage level range and a second abnormal AC voltage level range for operating in an off-mode in which the power factor corrector suspends its operation.

The first abnormal AC voltage level range and the second abnormal AC voltage level range may include voltage ranges of 65V or less, and 260V or more, respectively.

The plurality of AC voltage level ranges may further include a plurality of hysteresis ranges that are located at boundaries between the first AC voltage level range, the second AC voltage level range, the third AC voltage level range, the first abnormal AC voltage level range and the second abnormal AC voltage level range, and wherein properties of the plurality of hysteresis ranges may be used to determine what range out of the plurality of AC voltage level ranges the AC voltage level is in.

The plurality of hysteresis ranges may include a first hysteresis range, a second hysteresis range, a third hysteresis range, and a fourth hysteresis range where the AC voltage level equals ±a V of AC voltage values corresponding to the boundaries among respective ranges in terms of the AC voltage level.

The first hysteresis range, the second hysteresis range, the third hysteresis range, and the fourth hysteresis range may correspond to voltage ranges of 60±5V (60~70V), 140±5V (145~155V), 240±5V (235~245V) and 260±5V (255~265V), respectively.

The plurality of target DC voltage levels may include a first DC voltage level, a second DC voltage level and a third DC voltage level.

The first DC voltage level, the second DC voltage level, and the third DC voltage level may correspond to 350V, 360V and 385V, respectively.

According to an aspect of another exemplary embodiment, there is provided a method for power control by receiving AC power and supplying operating power to an electronic apparatus, the method including rectifying a current of an alternating current (AC) power input that is provided as input power into a direct current (DC), detecting an AC voltage level of the AC power input, and controlling a DC voltage level of a DC voltage output set at a DC voltage level corresponding to the AC voltage level, wherein the DC voltage level is selected from a plurality of target DC voltage levels each corresponding to at least one from a plurality of AC voltage level ranges; and supplying the DC voltage output as operating power to the electronic apparatus.

The supplying may include determining whether the AC voltage level is included in any of the plurality of AC voltage level ranges, selecting one from the plurality of target DC voltage levels corresponding to the determined AC voltage level range, and controlling the DC voltage level of the DC voltage output to be the one selected from the plurality of target DC voltage levels.

The supplying may further include determining whether the AC voltage level is included in any of a plurality of abnormal AC voltage level ranges, and operating in an off-mode configured to suspend controlling the DC voltage level of the DC voltage output if it is determined that the AC voltage level is included in any of the plurality of abnormal AC voltage level ranges.

The supplying may further include determining whether the AC voltage level is included in any of a plurality of hysteresis ranges located at boundaries between the plurality of AC voltage level ranges and the plurality of abnormal AC voltage level ranges, and determining which range the AC voltage level is included in by using hysteresis properties in response to determining that the AC voltage level is included in any of the plurality of hysteresis ranges.

According to an aspect of another exemplary embodiment, there is provided a display apparatus including a signal receiver configured to receive an image signal, a signal processor configured to process the image signal, a display configured to display an image based on the image signal, and a power circuit part configured to receive AC power input and supplies operating power to the display, the power circuit part including a rectifier configured to rectify a current of an alternating current (AC) power input that is provided as input power into a direct current (DC), and a power factor corrector configured to output a DC voltage output set at a DC voltage level corresponding to an AC voltage level of the AC power input, and supplies the DC voltage as operating power to the electronic apparatus, wherein the DC voltage level is selected from a plurality of target DC voltage levels each corresponding to at least one from a plurality of AC voltage level ranges.

The power factor corrector may include an AC voltage detector configured to detect the AC voltage level, and a power factor correction (PFC) controller configured to control the DC voltage level of the DC voltage output by setting the rectifier to rectify the AC power input to the DC voltage level selected from the plurality of target DC voltage levels corresponding to the plurality of AC voltage level ranges according to the AC voltage level of the AC voltage input detected by the AC voltage detector.

The plurality of AC voltage level ranges may include a first AC voltage level range, a second AC voltage level range, and a third AC voltage level range.

The first AC voltage level range, the second AC voltage level range, and the third AC voltage level range may include voltage ranges of 65 to 150V, of 150 to 240V and of 240 to 260V, respectively.

The plurality of AC voltage level ranges may further include a first abnormal AC voltage level range and a second abnormal AC voltage level range for operating in an off-mode in which the power factor corrector suspends its operation.

The first abnormal AC voltage level range and the second abnormal AC voltage level range may include voltage ranges of 65V or less, and 260V or more, respectively.

The plurality of AC voltage level ranges may further include a plurality of hysteresis ranges that are located at boundaries between the first AC voltage level range, the second AC voltage level range, the third AC voltage level range, the first abnormal AC voltage level range, and the second abnormal AC voltage level range, and wherein properties of the plurality of hysteresis ranges may be used to determine what range out of the plurality of AC voltage level ranges the AC voltage level is in.

The plurality of hysteresis ranges may include a first hysteresis range, a second hysteresis range, a third hysteresis range, and a fourth hysteresis range where the AC voltage level equals ±a V of AC voltage values corresponding to the boundaries among respective ranges in terms of the AC voltage level.

The first hysteresis range, the second hysteresis range, the third hysteresis range, and the fourth hysteresis range may correspond to voltage ranges of 60±5V (60~70V), 140±5V (145~155V), 240±5V (235~245V) and 260±5V (255~265V), respectively.

The plurality of target DC voltage levels may include a first DC voltage level, a second DC voltage level, and a third DC voltage level.

The first DC voltage level, the second DC voltage level, and the third DC voltage level may correspond to 350V, 360V and 385V, respectively.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Hereinafter, a power circuit part, a power control method thereof and a display apparatus having the same according to embodiments will be described in detail with reference to drawings.

Figure 2:
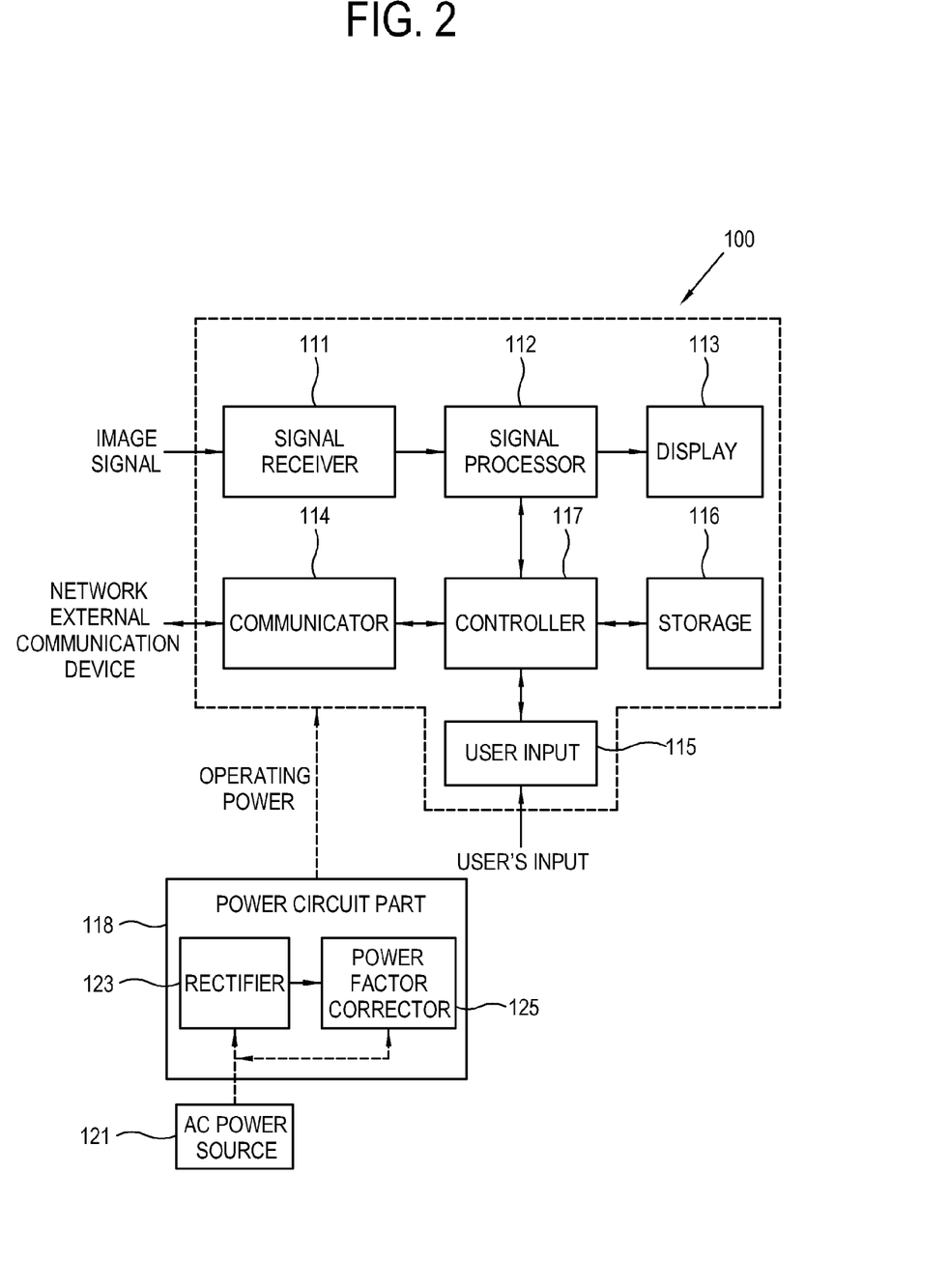
FIG. 2 is a block diagram of a display apparatus including a power circuit part according to an exemplary embodiment.

FIG. 2 is a block diagram of a display apparatus 100 including a power circuit part according to an exemplary embodiment.

The display apparatus 100 may be implemented as a TV, and receives and processes an image signal and displays an image based on the processed image signal.

As shown therein, the display apparatus 100 includes a signal receiver 111, a signal processor 112, a display 113, a communicator 114, a user input 115, a storage 116 and a controller 117.

The signal receiver 111 may receive an image signal from an external source. The image signal received by the signal receiver 111 may include a broadcasting signal such as a digital TV (DTV) signal and a cable broadcasting signal. In this case, the signal receiver 111 may tune and receive a broadcasting signal of a channel selected by a user, according to a control of the controller 117.

The image signal received by the signal receiver 111 may further include signals output by imaging devices such as a digital versatile disc (DVD) and Blu-ray disc (BD). The signal receiver 111 may further receive an audio signal for outputting audio, and a data signal for outputting data information. The image signal, audio signal, and data signal according to the present exemplary embodiment may be received together as a single signal.

The signal processor 112 processes an image signal received by the signal receiver 111 to display an image on the display 113 based on the processed image signal. The image processing operation of the signal processor 112 may include decoding, image enhancing, timing adjustments, and scaling operations. The signal processor 112 may process audio signals and data signals received by the signal receiver 111.

The display 113 displays an image thereon based on the image signal processed by the signal processor 112. The display 113 may include a liquid crystal display (LCD) panel to display an image thereon. According to an exemplary embodiment, the display 113 may include the LCD panel, a panel driver, and a backlight unit. The display 113 may display data information included in the data signal processed by the signal processor 112.

The display apparatus 100 may further include an audio output such as a speaker to output an audio based on an audio signal processed by the signal processor 112.

The communicator 114 may communicate with an external communication device through a network such as the Internet. Alternatively, the communicator 114 may communicate with the communication device through a local area network such as Bluetooth. The communicator 114 performs communication according to a control of the controller 117, and may transmit information to, or receive information from, a counterpart communication device. The information which is transmitted to the counterpart communication device through the communicator 114 may include at least one of images, audios and data, and may be processed consistently with the related information and output to the display 113.

The user input 115 may be implemented as, e.g., a remote controller or a manipulation panel configured to receive a user's input. The user input 115 may include an input key to turn on or off the display apparatus 100. The user's input which is received by the user input 115 is transmitted to the controller 117.

The storage 116 may be implemented as a non-volatile memory such as a flash memory or a hard disc drive to store data and information of the display apparatus 100.

The controller 117 controls overall operations of elements of the display apparatus 100, and may include firmware as a control program, and a central processing unit, (CPU) and a random access memory (RAM) to execute the firmware.

The display apparatus 100 may further include a power circuit part 118 to supply operating power to the foregoing elements such as the display 113. The power circuit part 118 may receive alternating current (AC) power, such as commercial power, convert the AC power into power at a necessary level for operating the elements such as the display 113, and supply the converted power to the elements. FIG. 2 generally shows the operating power being provided to the display apparatus. A person of ordinary skill in the art will appreciate that a detailed power supply route from the power circuit part 118 to each of the elements included the display 113 may be provided.

Figure 3:
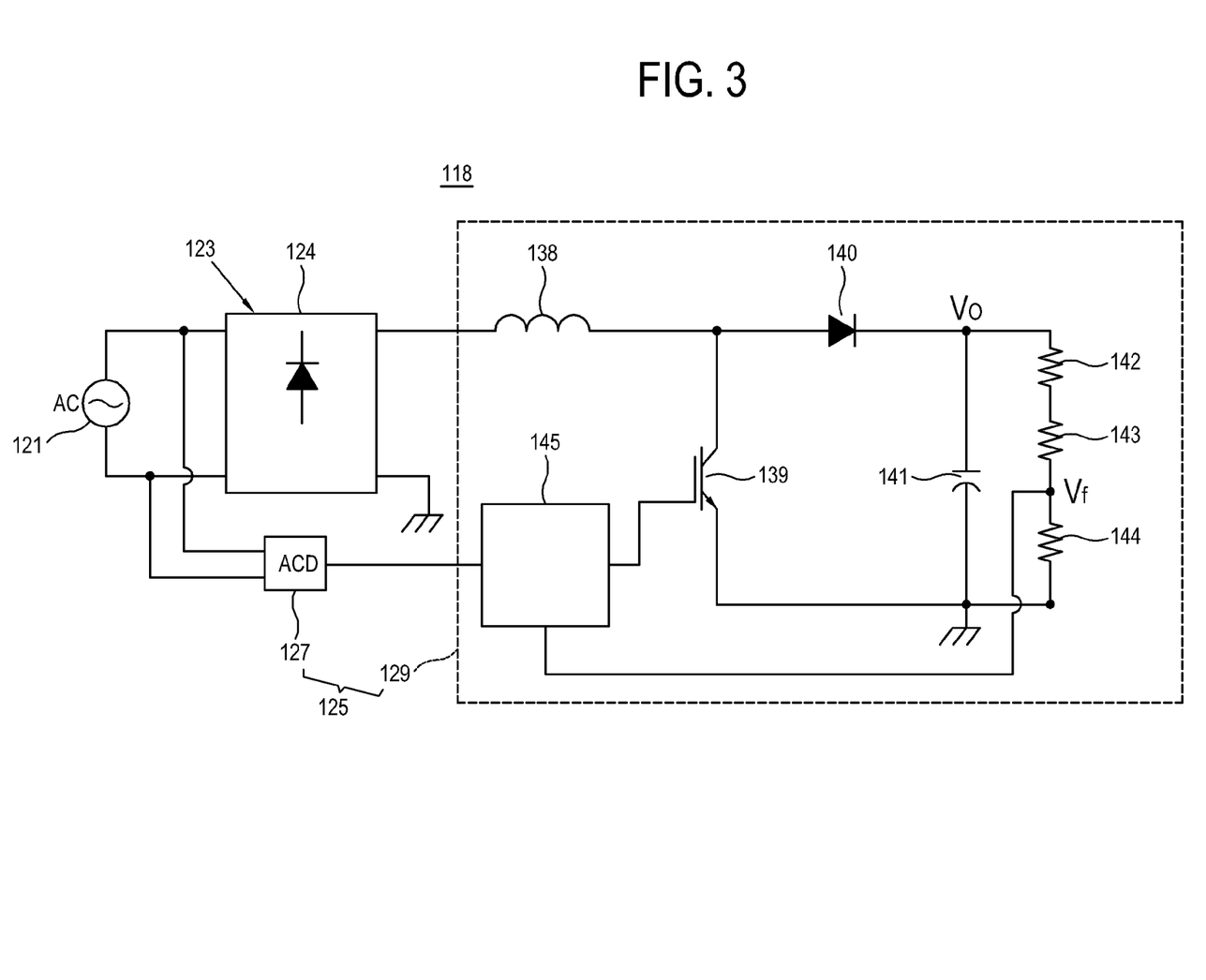
FIG. 3 is a circuit diagram of a power circuit part according to an exemplary embodiment.

Referring to FIGS. 2 and 3, the power circuit part 118 according to an exemplary embodiment includes a rectifier 123 and a power factor corrector 125.

The rectifier 123 rectifies a current of AC power output from an AC power source 121 and converts the AC power into DC power. The rectifier may be implemented as, e.g., a bridge diode 124 but is not limited thereto.

The power factor corrector 125 includes an AC voltage detector 127, and a power factor correction (PFC) circuit 129.

The AC voltage detector 127 is connected to opposite output terminals of the AC power source 121, detects a voltage level of an AC voltage output by the opposite output terminals of the AC power source 121, and outputs a corresponding voltage signal to the PFC circuit 129.

The PFC circuit 129 includes an inductor 138, a diode 140, a smoothing capacitor 141, first to third feedback resistors 142, 143 and 144, a field effect transistor (FET) 139 and a PFC controller 145.

The inductor 138 charges a voltage when the FET 139 is turned on, and outputs the charged voltage together with a DC voltage output by the rectifier 123 to the diode 140 when the FET 139 is turned off, according to a control of the PFC controller 145.

The smoothing capacitor 141 smoothes a DC voltage output by the inductor 138 through the diode 140 when the FET 139 is turned off.

The PFC controller 145 includes a digital integrated circuit (IC) chip such as a microprocessor, and outputs a DC voltage at a level selected from a plurality of predetermined target DC voltage levels corresponding to a plurality of predetermined AC voltage levels, according to a level of an AC voltage corresponding to the voltage signal detected and output by the AC voltage detector 127, and supplies the DC voltage as operating power $V_O$ to the elements such as the display 113.

That is, the PFC controller 145 switches the FET 139 in a predetermined frequency based on a voltage Vf provided by the feedback resistors 142, 143 and 144 to output a DC voltage at the selected target DC voltage level when a voltage signal is input corresponding to the level of the AC voltage output by the AC voltage detector 127. As a result, the output DC voltage charged to the smoothing capacitor 141 is boosted to the selected target DC voltage level, and a power factor of the power circuit part 118 is corrected. The boosted DC voltage is supplied as the operating voltage $V_0$ necessary for operating the elements such as the display 113.

Figure 4:
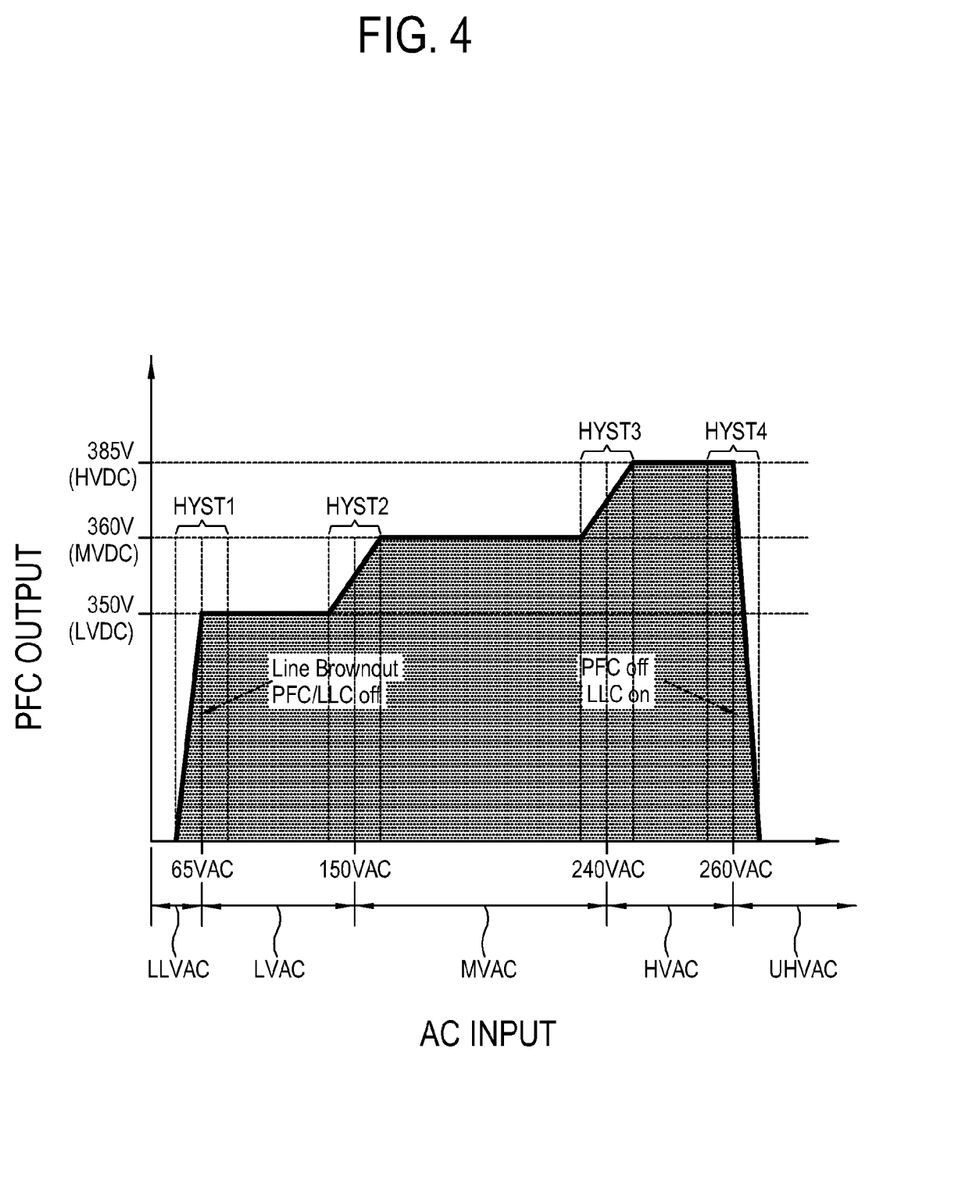
FIG. 4 is a graph illustrating an example of a DC voltage that is variably output at different levels depending on a level of an input AC power, by a power factor corrector of a power circuit part according to an exemplary embodiment.

As shown in FIG. 4, a plurality of AC voltage level ranges may include, e.g., first to third AC voltage level ranges LVAC, MVAC and HVAC, and may be stored in advance in the PFC controller 145. The first to third AC voltage level ranges LVAC, MVAC and HVAC may be set as ranges of 65V to 150V, 150V to 240V and 240V to 260V, respectively, as the level of the AC voltage.

A plurality of target DC voltage levels may include first to third DC voltage levels LVDC, MVDC, and HVDC which correspond to the first to third AC voltage level ranges LVAC, MVAC and HVAC, and may be stored in advance in the PFC controller 145. The first to third DC voltage levels LVDC, MVDC and HVDC may be set as approximately 350V, 360V and 385V, respectively.

As shown in FIG. 4, voltage signals may be consecutively input by the AC voltage detector 127 to the PFC controller 145 at the AC voltage levels corresponding to the first to third AC voltage level ranges LVAC, MVAC and HVAC as the ranges of 65V to 150V, 150V to 240V and 240V to 260V, respectively. The PFC circuit 129 variably control the DC voltage charged to the smoothing capacitor 141 into the first to third DC voltage levels LVDC, MVDC, and HVDC of approximately 350V, 360V and 385V, respectively.

In the power circuit part 118, which is configured as above, if the input AC voltage levels are within the first to third AC voltage level ranges LVAC, MVAC and HVAC, the target DC voltage levels converted by the PFC circuit 129 may be approximately 350V, 360V and 385V, which are lower than approximately 395V single DC voltage level. In particular, if the input AC voltage levels are within the first and second AC voltage level ranges LVAC and MVAC, the target DC voltage levels converted by the PFC circuit 129 are approximately 350V and 360V, respectively, which are lower than 395V. Accordingly, AC-DC conversion efficiency for the target DC voltage may be improved by the power circuit part 118.

The parts such as the inductor 138, the FET 139, and the diode 140 used in the PFC circuit 129 of the power factor corrector 125 may be those operating at approximately 350 to 385V which is relatively lower than the related art. As a result, not only may the DC bias be reduced, but the power circuit part 118 may be downsized and manufacturing costs may be reduced.

The power factor corrector 125 may output various DC voltages including approximately 350V, 360V and 385V rather than only a single high DC voltage of approximately 395V as an output DC voltage. Therefore, input power setup of a power switching part such as DC-DC local link converter (LLC) which controls voltages and supplies currents at a consistent level to elements such as the display 113 may be easily conducted.

Returning to FIG. 3, according to an exemplary embodiment, if a level of the AC voltage detected by the AC voltage detector 127 is abnormal, the PFC controller 145 may operate in an off-mode for suspending a switching operation of the FET 139, and thereby may provide a brown-out function if the AC voltage is low (e.g. approximately 65V or less), and prevent any unnecessary operation of the power factor corrector 125 if the AC voltage is high (e.g. approximately 260V or more).

Further, as shown in FIG. 4, the plurality of AC voltage level ranges may further include first and second abnormal AC voltage level ranges LLVAC and UHVAC for the PFC controller 145 to suspend the switching operation of the FET 139 when the AC voltage level is within the concerned range, and the first and second abnormal AC voltage level ranges LLVAC and UHVAC are stored in advance in the PFC controller 145. The first and second abnormal AC voltage level ranges LLVAC and UHVAC may be set as a range of a certain level or less, e.g. of approximately 65V or less, and as a range of a certain level or more, e.g. of approximately 260V or more, respectively.

Accordingly, voltage stress loaded onto the parts including, for example, a snubber, the FET 139, and the diode 140 of the power factor corrector 250 is reduced, avoiding operation upon a receipt of a high AC voltage of approximately 260V or more as input power. The power factor corrector 125, according to an exemplary embodiment, may employ parts with lower specifications as compared with related art power factor correctors, thereby possibly avoiding the increase in the manufacturing costs.

According to an exemplary embodiment, if the AC voltage level is repeatedly fluctuated within the adjacent AC voltage level ranges LVAC, MVAC and HVAC/first and second abnormal AC voltage level ranges LLVAC and UHVAC due to abnormal power system, usage of high voltage devices and other environmental conditions, the PFC controller 145 may prevent a drastic fluctuation of the output DC voltage.

To do so, the PFC controller 145 determines the AC voltage level range LLVAC, LVAC, MVAC, HVAC or VAC of the AC voltage by using hysteresis properties when the AC voltage level is in hysteresis ranges HYST1 to HYST4 (refer to FIG. 4) located in boundaries among the first to third AC voltage level ranges LVAC, MVAC and HVAC/first and second abnormal AC voltage level ranges LLVAC and UHVAC. The PFC controller 145 controls the DC voltage charged to the smoothing capacitor 141 into the concerned DC voltage level corresponding to the determined AC voltage level range LLVAC, LVAC, MVAC, HVAC or UHVAC, or operates in the off-mode for suspending the switching operation of the FET 139 entirely.

Further, until the AC voltage level gets out of the hysteresis range HYST1, HYST2, HYST3 or HYST4 where it is currently located, the PFC controller 145 maintains the AC voltage level range as the currently determined AC voltage level range, i.e. the range prior to entering the hysteresis range HYST1, HYST2, HYST3 or HYST4, and after the AC voltage level gets out thereof, the PFC controller 145 changes the AC voltage level range to the newly entered AC voltage level range. Thereafter, the PFC controller 145 boosts the DC voltage charged to the smoothing capacitor 141 to the concerned DC voltage level, or operates in the off-mode for suspending the switching operation of the FET 139, corresponding to the changed AC voltage level range.

As shown in FIG. 4, the hysteresis ranges may be stored in advance in the PFC controller 145, and may include a first hysteresis range HYST1 located in a boundary between the first abnormal AC voltage level range LLVAC and the first AC voltage level range LVAC; a second hysteresis range HYST2 located in a boundary between the first and second AC voltage level ranges LVAC and MVAC; a third hysteresis range HYST3 located in a boundary between the second and third AC voltage level ranges MVAC and HVAC; and a fourth hysteresis range HYST4 located in a boundary between the third AC voltage level range HVAC and the second abnormal AC voltage level range UHVAC. The first to fourth hysteresis ranges HYST1 to HYST4 may be set as ±aV ranges (a refers to a natural number), e.g., ±5V ranges (i.e., 60±5V (55~65), 140±5V (135~145V), 240±5V (235~245V) and 260±5V (255~265V)) of AC voltages corresponding to the boundaries among the respective ranges LLVAC, LVAC, MVAC, HVAC and UHVAC in terms of the AC voltage level.

For example, if the AC voltage level is upwardly changed from the lowest voltage of 145V to the highest voltage of 155V within the second hysteresis range HYST2, or is downwardly changed from the highest voltage of 245V to the lowest voltage of 235V within the third hysteresis range HYST3, the PFC controller 145 controls the DC voltage level into 350V or 385V as the first or third DC voltage level LVDC or HVDC corresponding to the first voltage level range LVAC or the third AC voltage level range HVAC which are prior to entering the second or third hysteresis range HYST2 or HYST 3 until the AC voltage level that is upwardly or downwardly changed gets out of the highest voltage of 155V in the second hysteresis range HYST2 or out of the lowest voltage of 235V in the third hysteresis range HYST3, and controls the DC voltage level into 360V as the second voltage level MVDC corresponding to the newly changed second AC voltage level range MVAC after the AC voltage level gets out thereof.

If the AC voltage level is downwardly changed from the highest voltage of 70V to the lowest voltage of 60V within the first hysteresis range HYST1, or is upwardly changed from the lowest voltage of 255V to the highest voltage of 265V within the fourth hysteresis range HYST4, the PFC controller 145 controls the DC voltage level into 350V or 385V as the first or third DC voltage level LVDC or HVDC corresponding to the previous first voltage level range LVAC or the third AC voltage level range HVAC until the AC voltage level that is upwardly or downwardly changed gets out of the lowest voltage of 60V in the first hysteresis range HYST1 or out of the highest voltage of 265V in the fourth hysteresis range HYST4, and turns off the switching operation of the FET 139, corresponding to the first or second abnormal AC voltage level range LLVAC or UHVAC after the AC voltage level gets out thereof. As a result, the AC voltage of 60V or less, or 265V or more which is output through the AC power source 121 is converted into a corresponding DC voltage by the rectifier 12, and is not boosted by the PFC circuit 129.

In the foregoing paragraphs, the PFC controller 145 has been implemented and explained as a digital IC chip such as a microprocessor, but not limited thereto. Alternatively, the PFC controller 145 may be implemented as an analog IC chip which gradually and variably controls the DC voltage charged to the smoothing capacitor 141 into approximately 350V, 360V and 385V as the first to third DC voltage levels LVDC, MVDC and HVDC according to the level of the input AC voltage with the same configuration and according to the same principle as above.

In the foregoing paragraphs, the plurality of AC voltage level ranges has been explained as including three AC voltage level ranges LVAC, MVAC and HVAC and four hysteresis ranges HYST1 to HYST4, and the plurality of target DC voltage levels has been explained as including three DC voltage levels LVDC, MVDC and HVDC, but not limited thereto. Alternatively, the plurality of AC voltage level ranges may include two (or four or more) AC voltage level ranges and three (or five or more) hysteresis ranges while the plurality of target DC voltage levels may include two (or four or more) DC voltage levels.

Hereinafter, a power control method of the power circuit part 118 which receives AC power and supplies operating power to an electronic apparatus, such as the display apparatus 100, will be described.

Figure 5:
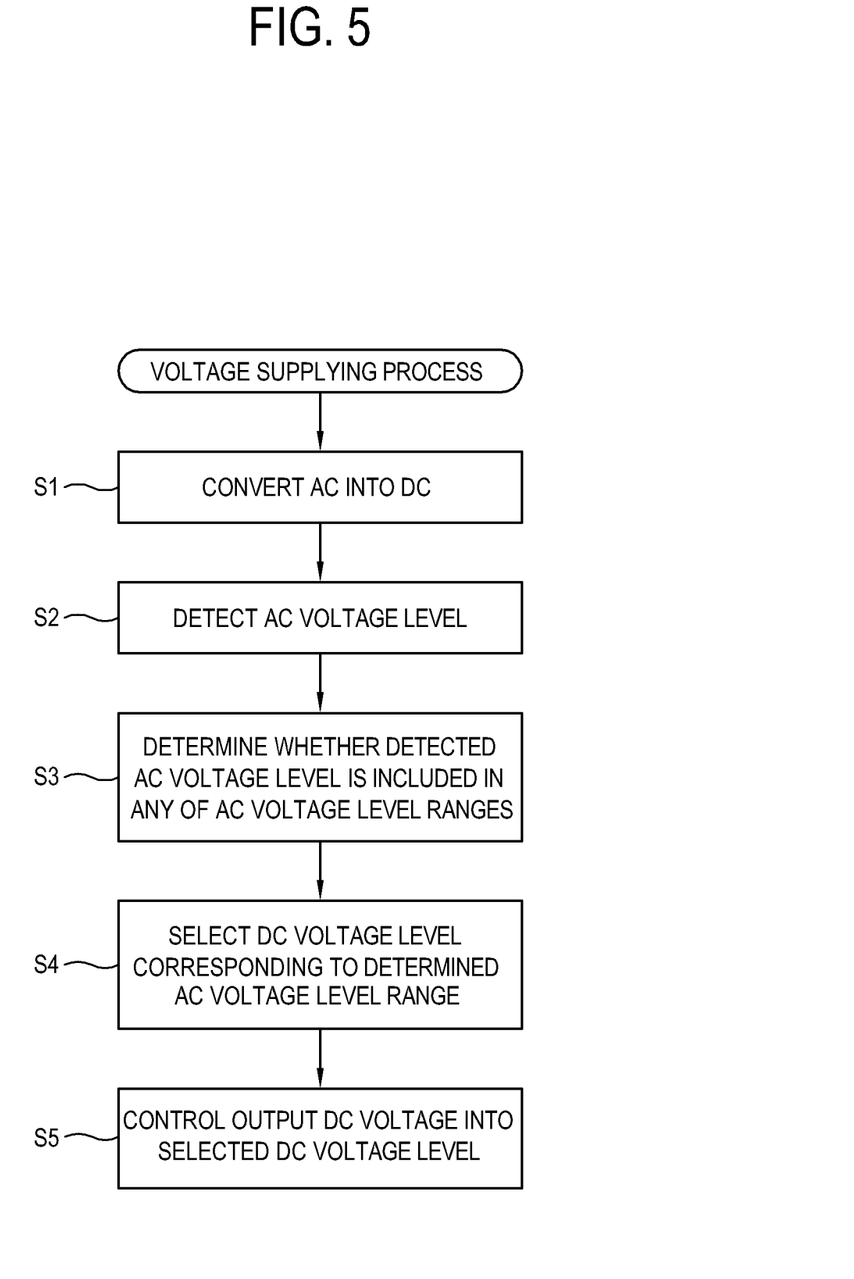
FIG. 5 is a flowchart showing a power control method of a power circuit part according to an exemplary embodiment.

Referring to FIG. 5, the rectifier 123, as shown in FIG. 2, may convert the current of the input power output by the AC power source 121, as also shown in FIG. 2, into a DC power signal (S1).

Concurrently, the AC voltage detector 127 detects the AC voltage level of the input power output by the AC power source 121, and transmits the voltage signal to the PFC controller 145 (S2).

The PFC controller 145 may determine the AC voltage level from the voltage signal transmitted by the AC voltage detector 127, and determine whether the determined AC voltage level is included in any of the predetermined first to third AC voltage level ranges LVAC, MVAC and HVAC (S3). For example, if the AC voltage level detected by the AC voltage detector 127 is 220V, the PFC controller 145 determines that the AC voltage level range is included in the second AC voltage level range MVAC of 150V to 240V.

The PFC controller 145 selects the second DC voltage level MVDC, i.e., 360V from the predetermined first to third DC voltage levels LVDC, MVDC and HVDC corresponding to the second AC voltage level range MVAC determined at operation S3 (S4).

The PFC controller 145 boosts the output DC voltage charged to the smoothing capacitor 141, to the second DC voltage level MVDC of 360V selected at operation S4 by switching the FET 139 in a predetermined frequency based on the voltage Vf provided by the feedback resistors 142, 143 and 144 (S5). The boosted DC voltage is supplied as the operating voltage $V_O$ necessary for operating the elements such as the display 113.

At operation S3, the PFC controller 145 may further determine whether the determined AC voltage level is normal or abnormal, e.g. whether the AC voltage level is included in the first or second abnormal AC voltage level range LLVAC or UHVAC before or after determining whether the AC voltage level is included in any of the first to third AC voltage levels LVAC, MVAC and HVAC. If it is determined that the AC voltage level is included in the first or second abnormal AC voltage level range LLVAC or UHVAC, the PFC controller 145 operates in the off-mode for suspending the switching operation of the FET 139.

At operation S3, after determining whether the determined AC voltage level is included in any of the first to third AC voltage level ranges LVAC, MVAC and HVAC and/or after determining whether the determined AC voltage level is included in the first or second abnormal AC voltage level range LLVAC or UHVAC, the PFC controller 145 may further determine whether the AC voltage level is included the first to fourth hysteresis ranges HYST1 to HYST4 located in the boundaries among the first to third AC voltage level ranges LVAC, MVAC and HVAC/first and second abnormal AC voltage level ranges LLVAC and UHVAC. If it is determined that the AC voltage level is included in one of the first to fourth hysteresis ranges HYST1 to HYST4, the PFC controller 145 may determine the AC voltage level range LLVAC, LVAC, MVAC, HVAC or UHVAC in which the AC voltage level is included, by using the hysteresis properties as explained above with reference to FIG. 4. The PFC controller 145 may then perform operations following the operation S4 or operate in the off-mode for suspending the switching operation of the FET 139 according to the determined AC voltage level range LLVAC, LVAC, MVAC, HVAC or UHVAC.

As described above, the power circuit part 118, the power control method thereof, and the display apparatus 100 having the same according to the exemplary embodiment controls the output DC voltage supplied as the operating power $V_O$ to the elements such as the display 113 to be variably and gradually output at different levels according to the level of the AC voltage input as input power. As a result, the decrease in the AC-DC conversion efficiency which occurs due to the high DC voltage output regardless of the level of the input AC voltage may be prevented, and upsizing of the display apparatus and/or increase in manufacturing costs due to the usage of parts with high specification may be prevented.

Although a few exemplary embodiments have been shown and described, it will be appreciated by those skilled in the art that changes may be made in these exemplary embodiments without departing from the principles and spirit of the inventive concept, the range of which is defined in the appended claims and their equivalents.

What is claimed is:

1. A power circuit part of an electronic apparatus, the power circuit part comprising:
    a rectifier configured to rectify a current of an input alternating current (AC) power into a direct current (DC); and
    a power factor corrector configured to detect the input AC power and output a DC voltage output set at a DC voltage level corresponding to an AC voltage level of the detected input AC power, and supply the DC voltage as operating power to the electronic apparatus,
    wherein the power factor corrector is further configured to select the DC voltage level from a plurality of target DC voltage levels, each corresponding to at least one of a plurality of AC voltage level ranges,
    the plurality of AC voltage level ranges further comprises a plurality of hysteresis ranges which are located at boundaries therebetween, and
    the power factor corrector is further configured to determine whether the AC voltage level is included in any of the plurality of hysteresis ranges and, in response to determining that the AC voltage level is included in a hysteresis range of the plurality of hysteresis ranges, control the DC voltage output to a DC voltage level corresponding to a prior AC voltage level range in which the AC voltage level was located before being included in the hysteresis range.

2. The power circuit part according to claim 1, wherein the power factor corrector comprises:
    an AC voltage detector configured to detect the AC voltage level; and
    a power factor correction (PFC) controller configured to control the DC voltage level of the DC voltage output by the rectifier to be the DC voltage level selected from the plurality of target DC voltage levels corresponding to the plurality of AC voltage level ranges according to the AC voltage level of the AC voltage detected by the AC voltage detector.

3. The power circuit part according to claim 1, wherein the plurality of AC voltage level ranges comprises a first AC voltage level range, a second AC voltage level range, and a third AC voltage level range.

4. The power circuit part according to claim 3, wherein the first AC voltage level range is 65V to 150V, the second AC voltage level range is 150V to 240V, and the third AC voltage level range is 240 to 260V.

5. The power circuit part according to claim 3, wherein the plurality of AC voltage level ranges further comprises a first abnormal AC voltage level range and a second abnormal AC voltage level range for operating in an off-mode in which the power factor corrector suspends its operation.

6. The power circuit part according to claim 5, wherein the first abnormal AC voltage level range is 65V or less and the second abnormal AC voltage level range is 260V or more.

7. The power circuit part according to claim 5, wherein the plurality of hysteresis ranges comprises a first hysteresis range, a second hysteresis range, a third hysteresis range and a fourth hysteresis range where the AC voltage level equals ±a V of AC voltage values corresponding to the boundaries among respective ranges in terms of the AC voltage level.

8. The power circuit part according to claim 7, wherein the first hysteresis range is 55V to 65V, the second hysteresis range is 135V to 145V, the third hysteresis range is 235V to 245V, and the fourth hysteresis range is 255V to 265V.

9. The power circuit part according to claim 3, wherein the plurality of target DC voltage levels comprises a first DC voltage level, a second DC voltage level and a third DC voltage level.

10. The power circuit part according to claim 9, wherein the first DC voltage level is 350V, the second DC voltage level is 360V, and the third DC voltage level is 385V.

11. A power control method for receiving alternating current (AC) power and supplying operating power to an electronic apparatus, the power control method comprising:
    rectifying a current of an input AC power into a direct current (DC);
    detecting an AC voltage level of the input AC power;
    controlling a DC voltage level of a DC voltage output set at a DC voltage level corresponding to the detected AC voltage level, wherein the DC voltage level is selected from a plurality of target DC voltage levels each corresponding to at least one of a plurality of AC voltage level ranges; and
    supplying the DC voltage as operating power to the electronic apparatus,
    wherein the supplying comprises:
        determining whether the AC voltage level is included in any of a plurality of hysteresis ranges located at boundaries between the plurality of AC voltage level ranges; and
        controlling the DC voltage output, in response to determining that the AC voltage level is included in a hysteresis range of the plurality of hysteresis ranges, to a DC voltage level corresponding to a prior AC voltage level range in which the AC voltage level was located before being included in the hysteresis range.

12. The power control method according to claim 11, wherein the supplying comprises:
    determining whether the AC voltage level is included in any of the plurality of AC voltage level ranges;
    selecting a level from the plurality of target DC voltage levels corresponding to the determined AC voltage level range; and
    controlling the DC voltage level of the DC voltage output to be the selected level from the plurality of target DC voltage levels.

13. The power control method according to claim 12, wherein the supplying further comprises:
    determining whether the AC voltage level is included in any of a plurality of abnormal AC voltage level ranges; and
    operating in an off-mode for suspending controlling the DC voltage level of the DC voltage output in response to determining that the AC voltage level is included in any of the plurality of abnormal AC voltage level ranges.

14. A display apparatus comprising:
a signal receiver configured to receive an image signal;
a signal processor configured to process the image signal received by the signal receiver;
a display configured to display an image based on the image signal processed by the signal processor; and
a power circuit part configured to receive alternating current (AC) power input and supply operating power to the display, the power circuit part comprising:
a rectifier configured to rectify a current of an input AC power into a direct current (DC); and
a power factor corrector configured to detect the input AC power and output a DC voltage output set at a DC voltage level corresponding to an AC voltage level of the detected input AC power, and supply the DC voltage as operating power to the electronic apparatus,
wherein the power factor corrector is further configured to select the DC voltage level from a plurality of target DC voltage levels, each corresponding to at least one of a plurality of AC voltage level ranges,
wherein the plurality of AC voltage level ranges further comprises a plurality of hysteresis ranges which are located at boundaries therebetween, and
the power factor corrector is further configured to determine whether the AC voltage level is included in any of the plurality of hysteresis ranges, and control the DC voltage output, in response to determining that the AC voltage level is included in a hysteresis range of the plurality of hysteresis ranges, to a DC voltage level corresponding to a prior AC voltage level range in which the AC voltage level was located before being included in the hysteresis range.

15. The display apparatus according to claim 14, wherein the power factor corrector comprises:
an AC voltage detector configured to detect the AC voltage level; and
a power factor correction (PFC) controller configured to control the DC voltage level of the DC voltage output by the rectifier to be the DC voltage level selected from the plurality of target DC voltage levels corresponding to the plurality of AC voltage level ranges according to the AC voltage level of the input AC voltage detected by the AC voltage detector.

16. The display apparatus according to claim 14, wherein the plurality of AC voltage level ranges comprises a first AC voltage level range, a second AC voltage level range, and a third AC voltage level range.

17. The display apparatus according to claim 16, wherein the first AC voltage level range is 65V to 150V, the second AC voltage level range is 150V to 240V, and the third AC voltage level range is 240V to 260V.

18. The display apparatus according to claim 15, wherein the plurality of AC voltage level ranges further comprises a first abnormal AC voltage level range and a second abnormal AC voltage level range for operating in an off-mode in which the power factor corrector suspends its operation.

19. The display apparatus according to claim 18, wherein the first abnormal AC voltage level range is 65V or less and the second abnormal AC voltage level range is 260V or more.

20. The display apparatus according to claim 19, wherein the plurality of hysteresis ranges comprises a first hysteresis range, a second hysteresis range, a third hysteresis range, and a fourth hysteresis range where the AC voltage level equals ±a V of AC voltage values corresponding to the boundaries among respective ranges in terms of the AC voltage level.

21. The display apparatus according to claim 20, wherein the first hysteresis range is 55V to 65V, the second hysteresis range is 135V to 145V, the third hysteresis range is 235V to 245V, and the fourth hysteresis range is 255V to 265V.

22. The display apparatus according to claim 15, wherein the plurality of target DC voltage levels comprises a first DC voltage level, a second DC voltage level, and a third DC voltage level.

23. The display apparatus according to claim 22, wherein the first DC voltage level is 350V, the second DC voltage level is 360V, and the third DC voltage level is 385V.

24. A power circuit comprising:
a rectifier connected to an AC power source and configured to generate a rectified power signal;
an AC voltage detector connected to output terminals of the AC power source and configured to detect an AC voltage level of an AC power from the AC power source and provide a corresponding voltage signal; and
a power factor correction (PFC) controller configured to receive the rectified power signal and the corresponding voltage signal, and based on the rectified power signal and the corresponding voltage signal, select a DC voltage from a plurality of DC voltage levels, each of which corresponds to one of a plurality of AC voltage levels, and output the DC voltage,
wherein the plurality of AC voltage level ranges further comprises a plurality of hysteresis ranges which are located at boundaries therebetween, and
the PFC is further configured to determine whether the AC voltage level is included in any of the plurality of hysteresis ranges and, in response to determining that the AC voltage level is included in a hysteresis range of the plurality of hysteresis ranges, control the DC voltage output to a DC voltage level corresponding to a prior AC voltage level range in which the AC voltage level was located before being included the hysteresis range.

25. The power circuit of claim 24, wherein the PFC controller is further configured to switch a field effect transistor (FET) at a frequency based on a feedback voltage provided by feedback resistors such that the DC voltage is provided at a select level corresponding to the AC voltage level detected by the AC voltage detector.

26. A method of power control, the method comprising:
generating, using a rectifier connected to an AC power source, a rectified power signal;
detecting, using an AC voltage detector, an AC voltage level of an AC power from the AC power source and providing a voltage signal based on the AC voltage level; and
receiving, at a power factor correction (PFC) controller, the rectified power signal and the provided voltage signal; and
outputting, from the PFC controller, a DC voltage selected from a plurality of DC voltage levels, each of which corresponds to one of a plurality of AC voltage levels, based on the rectified power signal and the voltage signal,
wherein the supplying further comprises:
determining whether the AC voltage level is included in any of a plurality of hysteresis ranges located at boundaries between the plurality of AC voltage level ranges;
controlling the DC voltage output, in response to determining that the AC voltage level is included in a hysteresis range of the plurality of hysteresis ranges, to a DC voltage level corresponding to a prior AC voltage level range in which the AC voltage level was located before being included in the hysteresis range.

27. The method of claim 26, further comprising:
switching, using the PFC controller, a field effect transistor (FET) at a frequency based on a feedback voltage provided by feedback resistors such that the DC voltage is provided at a select level corresponding to the AC voltage level detected by the AC voltage detector.

28. A power circuit comprising:
a rectifier configured to rectify a current of an input alternating current (AC) power into a direct current (DC);
an AC voltage detector configured to detect an AC voltage level range of the input AC power and output a corresponding voltage signal;
a power factor correction (PFC) controller configured to receive the corresponding voltage signal and select, based on the corresponding voltage signal, a DC voltage level from a plurality of target DC voltage levels, each of which corresponds to one of a plurality of AC voltage levels, and output a DC voltage output at the DC voltage level,
wherein the plurality of AC voltage level range further comprises a plurality of hysteresis ranges which are located at boundaries therebetween, and
the power factor corrector is further configured to determine whether the AC voltage level is included in any of the plurality of hysteresis ranges and, in response to determining that the AC voltage level is included in a hysteresis range of the plurality of hysteresis ranges, control the DC voltage output to a DC voltage level corresponding to a prior AC voltage level range in which the AC voltage level was located before being included in the hysteresis range.

* * * * *